US012782535B2

(12) United States Patent
Tu et al.

(10) Patent No.: US 12,782,535 B2
(45) Date of Patent: Nov. 3, 2026

(54) VEHICLE AUXILIARY POSITIONING METHOD AND APPARATUS

(71) Applicant: Xiamen Yaxon Zhilian Technology Co., Ltd., Xiamen (CN)

(72) Inventors: Yankai Tu, Xiamen (CN); Qingxi Chen, Xiamen (CN); Xuhui Ye, Xiamen (CN)

(73) Assignee: Xiamen Yaxon Zhilian Technology Co., Ltd., Xiamen (CN)

( * ) Notice: Subject to any disclaimer, the term of this patent is extended or adjusted under 35 U.S.C. 154(b) by 311 days.

(21) Appl. No.: 18/705,728

(22) PCT Filed: Oct. 27, 2022

(86) PCT No.: PCT/CN2022/127812
§ 371 (c)(1),
(2) Date: Apr. 29, 2024

(87) PCT Pub. No.: WO2023/216520
PCT Pub. Date: Nov. 16, 2023

(65) Prior Publication Data

US 2025/0271566 A1 Aug. 28, 2025

(30) Foreign Application Priority Data

May 9, 2022 (CN) ......................... 202210499414.8

(51) Int. Cl.
*G01S 11/04* (2006.01)

(52) U.S. Cl.
CPC .................................... *G01S 11/04* (2013.01)

(58) Field of Classification Search
CPC ....................................................... G01S 11/04
See application file for complete search history.

(56) References Cited

U.S. PATENT DOCUMENTS

2011/0018737 A1 1/2011 Hsu et al.
2022/0060852 A1* 2/2022 Ha ............................ G01S 5/14

FOREIGN PATENT DOCUMENTS

CN 108345020 A 7/2018
CN 110333524 A 10/2019

(Continued)

OTHER PUBLICATIONS

Wang, Fa'an, et al. "Geometry-based cooperative localization for connected vehicle subject to temporary loss of GNSS signals." IEEE Sensors Journal 21.20 (2021): 23527-23536. (Year: 2021).*

(Continued)

*Primary Examiner* — Nazra Nur Waheed
(74) *Attorney, Agent, or Firm* — COOPER LEGAL GROUP LLC

(57) ABSTRACT

The present disclosure discloses a vehicle auxiliary positioning method and apparatus. The method includes: periodically sending, by a vehicle A, position information of the vehicle A to the outside; when the vehicle A detects a vehicle D, and the vehicle D is not capable of sending position information of the vehicle D to the outside, requesting, by the vehicle A, an auxiliary unit B and an auxiliary unit C that are capable of detecting the vehicle D to assist in auxiliary and cooperative positioning, to determine coordinates of the vehicle D. According to the present disclosure, vehicles that can send position information of the vehicles are used to perform auxiliary and cooperative positioning, so that in a mixed traffic scenario, a vehicle that cannot send position information of the vehicle can be positioned.

15 Claims, 4 Drawing Sheets

(56) References Cited

FOREIGN PATENT DOCUMENTS

| | | | | | |
|---|---|---|---|---|---|
| CN | 112346103 A | | 2/2021 | | |
| CN | 112859861 A | | 5/2021 | | |
| CN | 113674551 A | | 11/2021 | | |
| KR | 20180050449 A | * | 5/2018 | .............. | H04W 4/40 |

OTHER PUBLICATIONS

International Search Report cited in PCT/CN2022/127812 mailed Jan. 18, 2023, 7 pages.
Written Opinion cited in PCT/CN2022/127812 mailed Jan. 18, 2023, 3 pages.

* cited by examiner

VEHICLE AUXILIARY POSITIONING METHOD AND APPARATUS

CROSS-REFERENCE TO RELATED APPLICATIONS

This application is a national stage entry of International Patent Application PCT/CN2022/127812, filed Oct. 27, 2022, which claims priority to Chinese Patent Application 202210499414.8, filed on May 9, 2022. International Patent Application PCT/CN2022/127812 and Chinese Patent Application 202210499414.8 are incorporated herein by reference.

TECHNICAL FIELD

The present disclosure relates to the field of vehicle positioning, in particular to a vehicle auxiliary positioning method and apparatus.

BACKGROUND

The use of the 5G technology can enable vehicles to have a V2X communication capability between vehicles or between a vehicle and a road and the like. Combined with high-precision positioning of Beidou or GPS, a precise position of the vehicle may be sent to a surrounding vehicle, to implement traffic coordination and safety control. However, application of a 5G V2X technology is still developing. For a quite long period of time, a vehicle equipped with 5G and a vehicle not equipped with 5G travel together on the road. The vehicle not equipped with the 5G communication cannot send a real-time precise position of the vehicle. Therefore, if the vehicle equipped with 5G needs to know a real-time high-precision position of the vehicle not equipped with the 5G communication, the vehicle not equipped with the 5G communication can only be passively identified or detected through video, radar, or the like. However, most video or radar ranging can measure only a rough distance from a nearby vehicle, and a precise position of the nearby vehicle is not easily obtained.

There is no disclosed vehicle auxiliary positioning method and apparatus that can resolve the above defects in the prior art.

SUMMARY

To resolve the technical problem existing in the prior art, the present disclosure provides a vehicle auxiliary positioning method and apparatus, which uses a plurality of vehicles that can send position information of the vehicles to assist in auxiliary and cooperative positioning for a vehicle that cannot send position information of the vehicle, which requires low costs and are easy to promote in a large scale.

Technical solutions used to resolve the technical problem in the present disclosure are as follows:

A vehicle auxiliary positioning method, including: periodically sending, by a vehicle A, position information of the vehicle A to the outside; when the vehicle A detects a vehicle D, and the vehicle D cannot send position information of the vehicle D to the outside, requesting, by the vehicle A, an auxiliary unit B and an auxiliary unit C that can detect the vehicle D to assist in auxiliary and cooperative positioning within a communication range of the vehicle A, where the auxiliary unit B and the auxiliary unit C are vehicles or roadside units, first, determining whether the vehicle D is located on a straight line or an extended line on which the vehicle A and the auxiliary unit B or auxiliary unit C are located, if the vehicle D is located on the straight line or extended line on which the vehicle A and the auxiliary unit B or auxiliary unit C are located, determining coordinates of the vehicle D based on coordinates of the vehicle A, a distance between the vehicle A and the vehicle D, and a direction of a connection line between the vehicle A and the auxiliary unit B or the auxiliary unit C; if the vehicle D is not located on the straight line or extended line on which the vehicle A and the auxiliary unit B or auxiliary unit C are located, determining whether there are triangular relationships among the vehicle A, the vehicle D, and the auxiliary unit B and among the vehicle A, the vehicle D, and the auxiliary unit C separately, if there are the triangular relationships, calculating coordinates of the vehicle D according to a sine theorem or cosine theorem for a triangle.

As a preferred solution of the present disclosure, a distance AD between the vehicle A and the vehicle D, a distance AB between the vehicle A and the auxiliary unit B, a distance AC between the vehicle A and the auxiliary unit C, a distance BD between the auxiliary unit B and the vehicle D, and a distance CD between the auxiliary unit C and the vehicle D are acquired; and when AD+BD is equal to AB or AB+BD is equal to AD, the vehicle D is located on a straight line or extended line on which the vehicle A and the auxiliary unit B are located, and when AD+CD is equal to AC or AC+CD is equal to AD, the vehicle D is located on a straight line or extended line on which the vehicle A and the auxiliary unit C are located.

As a preferred solution of the present disclosure, the method further includes determining whether AD+BD is less than AB or AD+CD is less than AC, if it is determined that AD+BD is less than AB or AD+CD is less than AC, it means there is a measurement error, and auxiliary and cooperative positioning cannot be performed.

As a preferred solution of the present disclosure, the determining coordinates $(X_d, Y_d)$ of the vehicle D based on coordinates of the vehicle A, a distance between the vehicle A and the vehicle D, and a direction of a connection line between the vehicle A and the auxiliary unit B or the auxiliary unit C is specifically:

$$X_d = X_a + AD\cos(\theta)$$

$$Y_d = Y_a + AD\sin(\theta)$$

where $(X_a, Y_a)$ are the coordinates of the vehicle A, AD is the distance between the vehicle A and the vehicle D, θ is an included angle between the straight line on which the vehicle A and the auxiliary unit B or the auxiliary unit C are located relative to an x-axis of a rectangular coordinate system.

As a preferred solution of the present disclosure, that it is determined whether there are triangular relationships among the vehicle A, the vehicle D, and the auxiliary unit B and among the vehicle A, the vehicle D, and the auxiliary unit C separately is specifically, it is determined whether AD+BD is greater than AB and whether AD+CD is greater than AC. If AD+BD is greater than AB and AD+CD is greater than AC, there is a triangular relationship among the vehicle A, the vehicle D, and the auxiliary unit B and there is a triangular relationship among the vehicle A, the vehicle D, and the auxiliary unit C.

As a preferred solution of the present disclosure, the calculating the position coordinates of the vehicle D according to the sine theorem and cosine theorem of a triangle specifically includes: first, calculating inner angles □BAC, □DAC, and □BAD of the triangle according to the cosine theorem or the sine theorem, and determining whether the vehicle D is located inside or outside a triangle BAC formed by the vehicle A, the auxiliary unit B, and the auxiliary unit C based on the calculated inner angles; then, calculating the coordinates of the vehicle D.

As a preferred solution of the present disclosure, when □BAD+□DAC=□BAC, it means that the vehicle D is located on an outer side of a connection line between the auxiliary unit B and the auxiliary unit C inside a triangle BAC or outside the triangle BAC, and the position of the vehicle D is a position at which the coordinates of the vehicle A are used as a start point and a connection line between the vehicle A and the auxiliary unit B rotates at an angle □BAD in a direction closer to the auxiliary unit C at a distance of AD.

As a preferred solution of the present disclosure, when □BAC+□DAC=□BAD, it means that the vehicle D is located on an outer side of a connection line between the vehicle A and the auxiliary unit C outside the triangle BAC, and the position of the vehicle D is a position at which the coordinates of the vehicle A are used as a start point and a connection line between the vehicle A and the auxiliary unit B rotates at an angle □BAD in a direction closer to the auxiliary unit C at a distance of AD.

As a preferred solution of the present disclosure, when □BAC+□BAD=□DAC, it means that the vehicle D is located on an outer side of a connection line between the vehicle A and the auxiliary unit B outside the triangle BAC, and the position of the vehicle D is a position at which a connection line between the vehicle A and the auxiliary unit B rotates at an angle □BAD in a direction away from the auxiliary unit C at a distance of AD.

A vehicle auxiliary positioning apparatus, installed on a vehicle A and including:

- a positioning module, configured to detect position information of the vehicle A;
- a V2X communication module, configured to periodically send position information of the vehicle A to the outside;
- a detection module, configured to detect a straight-line distance from an external vehicle; and
- a determining and calculating module, which uses one of the above vehicle auxiliary positioning method to obtain position coordinates of a vehicle D.

It can be learned from the description of the present disclosure that, compared with the conventional technologies, the present disclosure has the following beneficial effects.

1. According to the present disclosure, a plurality of vehicles that can send position information of the vehicles are used to assist in auxiliary and cooperative positioning of a vehicle that cannot send position information of the vehicle, so that in a mixed traffic scenario, a current vehicle can accurately locate coordinates of another vehicle that cannot send position information of the another vehicle with low costs.

2. According to the present disclosure, data is transmitted between a vehicle and an auxiliary unit by using the V2X communication module, so that the amount of transmitted data is small, the influence on a load of the V2X communication is small, a calculation method is simple, the requirements for a controller are not high, and large-scale promotion and application are easy to implement.

Figure 1:
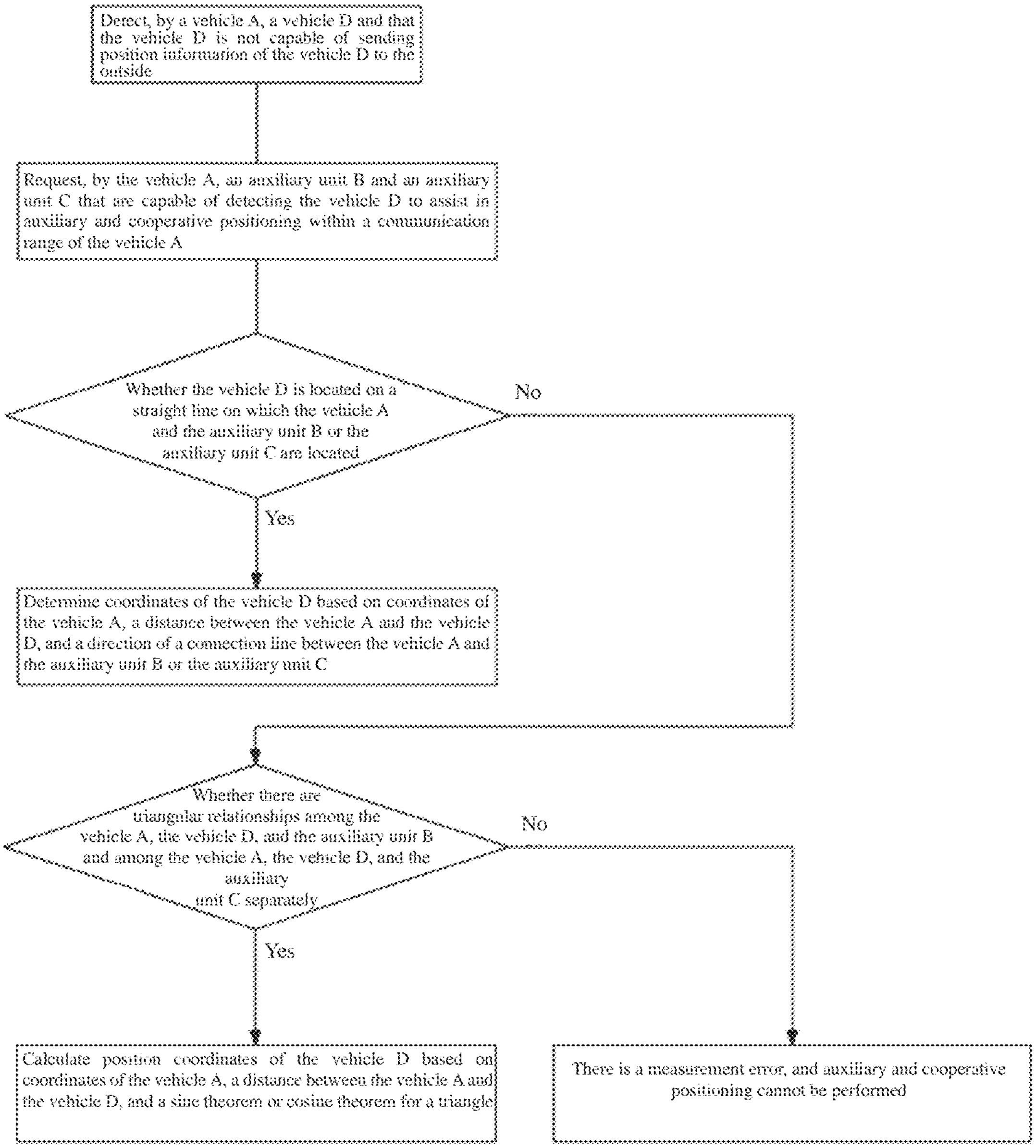
FIG. 1 is a flow chart of a method according to the present disclosure.

The present disclosure will be further illustrated with reference to the accompanying drawings and the specific embodiments.

DESCRIPTION OF EMBODIMENTS

The present disclosure will be further illustrated with reference to the accompanying drawings and the embodiments.

In the descriptions of the present disclosure, it should be noted that an orientation or a position relationship indicated by a term “internal”, “external”, “upper”, “lower”, “one side”, “the other side”, “one end”, “the other end”, “edge”, “relative”, “four corners”, “periphery”, or an “o-shaped structure” is based on an orientation or a position relationship shown in the accompanying drawings, and is merely intended for ease of describing the present disclosure and simplifying description, but does not indicate or imply that the indicated structure has a specific orientation or be constructed and operated in a specific orientation. Therefore, such term shall not be understood as a limitation on the present disclosure.

In addition, in the description of the present disclosure, unless otherwise stated, “a plurality of” means two or more than two. The term “and/or” describes an association relationship between associated objects and indicates that three relationships may exist. For example, A and/or B may indicate the following three cases: only A exists, both A and B exist, and only B exists.

A vehicle auxiliary positioning method is provided. A vehicle A can periodically send position information of the vehicle A to the outside. When the vehicle A detects a vehicle D, and the vehicle D is not capable of sending position information of the vehicle D to the outside, the vehicle A requests an auxiliary unit B and an auxiliary unit C that are capable of detecting the vehicle D to assist in auxiliary and cooperative positioning within a communication range of the vehicle A. The auxiliary unit B may be a vehicle or a roadside unit, and the auxiliary unit C may be a vehicle or a roadside unit. Preferably, the auxiliary unit B and the auxiliary unit C are vehicles.

The vehicle A, the auxiliary unit B, and the auxiliary unit C are all equipped with a V2X communication module and a detection module. By using the V2X communication module, positions of the vehicle A, the auxiliary unit B, and the auxiliary unit C that are highly precisely positioned are sent to the outside, that is, the vehicle A, the auxiliary unit B, and the auxiliary unit C can know actual position coordinates of the others. The detection module may be a detection device such as a camera or a radar configured to detect a straight-line distance from an external vehicle. The vehicle D does not have a related communication device or positioning module installed and cannot send position information of the vehicle D to the outside.

In the present disclosure, the vehicle detects the presence of the vehicle D when driving, and a distance is AD, but does not know specific coordinates of the vehicle D, and therefore it is difficult to determine which lane the vehicle D is on. In this case, it is difficult to obtain precise position coordinates of the vehicle D only by using the vehicle A. Therefore, the vehicle A uses the V2X communication and requests another vehicle or roadside unit that is also provided with the V2X communication near a current position and can independently detect a distance from the vehicle D to assist in positioning.

In this example scenario, the auxiliary unit B and the auxiliary unit C are within a range of the V2X communication near the vehicle A, and can detect a distance BD between the vehicle D and the auxiliary unit B and a distance CD a distance between the vehicle D and the auxiliary unit C separately. In addition, for the vehicle A, auxiliary positioning can be implemented in a case that positions of the auxiliary unit B and the auxiliary unit C are farther than a position of the vehicle D, or definitely, positions of the auxiliary unit B and the auxiliary unit C are closer than a position of the vehicle D. Therefore, the auxiliary unit B and the auxiliary unit C can send the distances BD, CD and the precise coordinates of the auxiliary unit B and auxiliary unit C to the vehicle A in response to the cooperative positioning request of the vehicle A. In addition, due to the extremely high real time performance of the V2X communication, after the vehicle A receives the coordinates and related distances of the auxiliary unit B and auxiliary unit C, relative movement of the vehicles during information transmission, and the coordinates and related distances are used current coordinates and distances.

That the vehicle A of the present disclosure uses the auxiliary unit B and auxiliary unit C to assist in auxiliary and cooperative positioning includes the following steps.

First, it is determined whether the vehicle D is located on a straight line on which the vehicle A and the auxiliary unit B or auxiliary unit C are located. If the vehicle D is located on the straight line on which the vehicle A and the auxiliary unit B or auxiliary unit C are located, coordinates of the vehicle D are determined based on coordinates of the vehicle A, a distance between the vehicle A and the vehicle D, and a direction of a connection line between the vehicle A and the auxiliary unit B or the auxiliary unit C. If the vehicle D is not located on the straight line on which the vehicle A and the auxiliary unit B or auxiliary unit C are located, it is determined whether there are triangular relationships among the vehicle A, the vehicle D, and the auxiliary unit B and among the vehicle A, the vehicle D, and the auxiliary unit C separately. If there are the triangular relationships, the coordinates of vehicle D are calculated according to a sine theorem and cosine theorem for a triangle.

Specifically, the vehicle A may obtain a distance between the vehicle A and the vehicle D as AD, a distance between the vehicle A and the auxiliary unit B as AB, a distance between the vehicle A and the auxiliary unit C as AC, a distance between the auxiliary unit B and the vehicle D as BD, and a distance between the auxiliary unit C and the vehicle D as CD, and it is determined as follows:

it is determined whether AD+BD is equal to AB, or whether AD+CD is equal to AC. When AD+BD is equal to AB, the vehicle D is located on a straight line on which the vehicle A and the auxiliary unit B is located. When AD+CD is equal to AC, the vehicle D is located on a straight line on which the vehicle A and the auxiliary unit C are located. Based on the coordinates of the vehicle A, the distance AD between the vehicle A and the vehicle D, and the direction of the connection line between the vehicle A and the auxiliary unit B or the auxiliary unit C, coordinates $(X_d, Y_d)$ of the vehicle D are determined. A common rectangular coordinate system is used as an example, and then coordinates of the vehicle D are as follows:

$$X_d = X_a + AD\cos(\theta)$$

$$Y_d = Y_a + AD\sin(\theta)$$

$(X_a, Y_a)$ are the coordinates of the vehicle A, and θ is an included angle between a straight line on which the vehicle A and the auxiliary unit B or the auxiliary unit C are located relative to an x-axis of the rectangular coordinate system.

When AD+BD is not equal to AB and AD+CD is not equal to AC, it is determined whether there are the triangular relationships among the vehicle A, the vehicle D, and the auxiliary unit B and among the vehicle A, the vehicle D, and the auxiliary unit C separately. Specifically, it is determined whether AD+BD is greater than AB and whether AD+CD is greater than AC. If AD+BD is greater than AB and AD+CD is greater than AC, there is a triangular relationship among the vehicle A, the vehicle D, and the auxiliary unit B, so that a triangle ADB can be formed, and there is a triangular relationship among the vehicle A, the vehicle D, and the auxiliary unit C, so that a triangle ADC can be formed. In addition, there is also a triangular relationship among the vehicle A, the auxiliary unit B, and the auxiliary unit C, so that a triangle ABC can be formed.

If it is determined that AD+BD is less than AB or AD+CD is less than AC, it means there is a measurement error, and auxiliary and cooperative positioning cannot be performed.

In a case that the above trigonometric relationship is met, calculating the position coordinates of the vehicle D according to the sine theorem and cosine theorem for a triangle specifically includes the following: first, inner angles ∠BAC, ∠DAC, and ∠BAD of the triangle are calculated according to the cosine theorem or the sine theorem. Based on the calculated inner angles, it is determined whether the vehicle D is located inside or outside the triangle BAC formed by the vehicle A, the auxiliary unit B, and the auxiliary unit C; then, coordinates of the vehicle D are calculated.

The cosine theorem for the triangle is used as an example, the triangle ABC has $\cos\angle BAC=(AC^2+AB^2-BC^2)/(2*AC*AB)$, a triangle ADC has $\cos\angle DAC=(AC^2+AD^2-DC^2)/(2*AC*AD)$, and a triangle ADB has $\cos\angle BAD=(AB^2+AD^2-DB^2)/(2*AC*AD)$, so that the inners angles ∠BAC, ∠DAC and ∠BAD are obtained through calculation for further determining.

Figure 2:
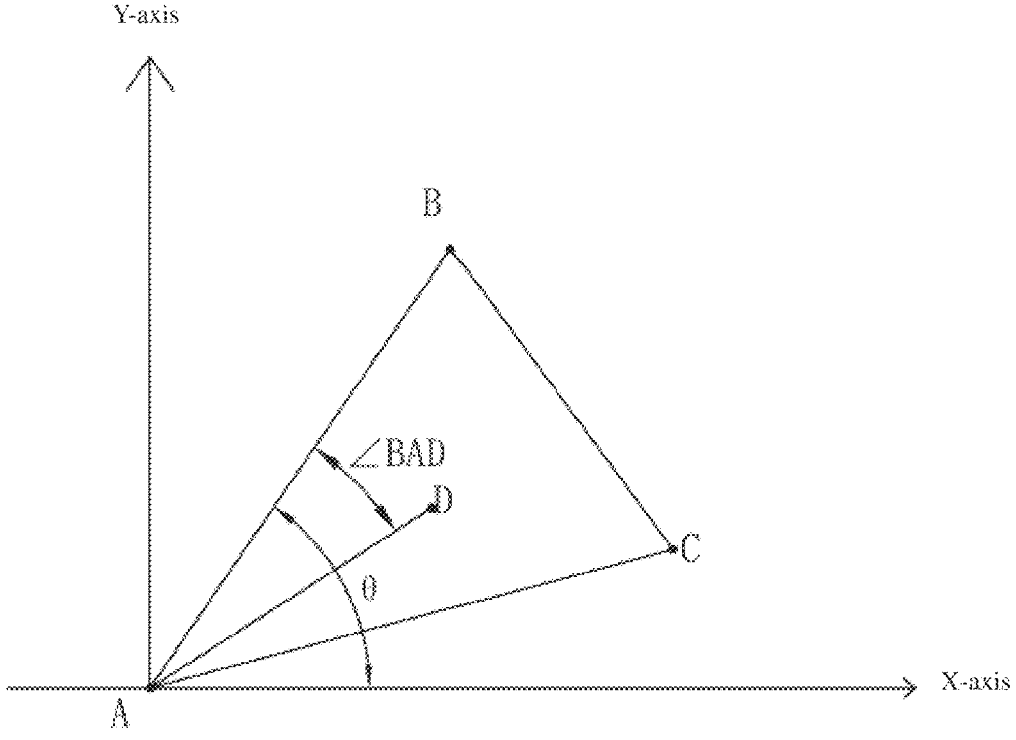
FIG. 2 is a schematic diagram of a vehicle D inside a triangle BAC according to the present disclosure.

When ∠BAD+∠DAC=∠BAC, it means that the vehicle D is located inside the triangle BAC. Refer to FIG. 2. The position of the vehicle D is a position at which the coordinates of the vehicle A are used as a start point and a connection line between the vehicle A and the auxiliary unit B rotates at an angle ∠BAD in a direction closer to the auxiliary unit C at a distance of AD.

Specifically, a common rectangular coordinate system is used as an example, and it is assumed that the coordinates of the vehicle A are $(X_a, Y_a)$, then the coordinates $(X_d, Y_d)$ of the vehicle D are:

$$X_d = X_a + AD\cos(\theta - \angle BAD)$$

$$Y_d = Y_a + AD\sin(\theta - \angle BAD)$$

θ is an included angle between the connection line between the vehicle A and the auxiliary unit B relative to the x-axis of the rectangular coordinate system.

Figure 3:
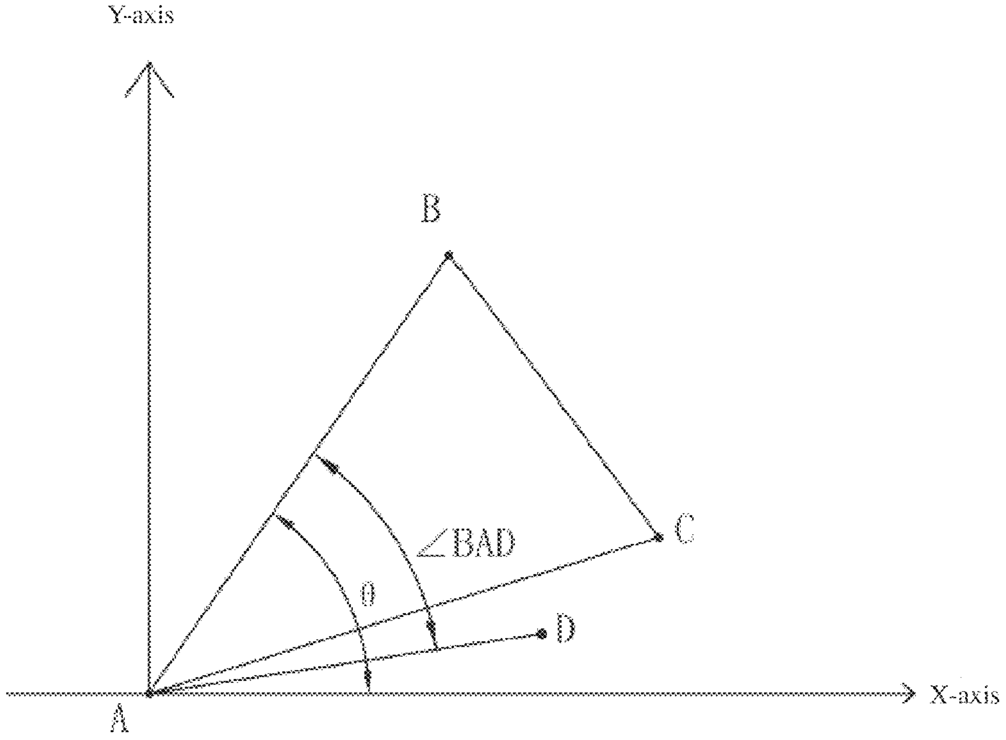
FIG. 3 is a schematic diagram of a vehicle D on one side outside a triangle BAC according to the present disclosure.

When ∠BAC+∠DAC=∠BAD, it means that the vehicle D is located on an outer side of a connection line between the vehicle A and the auxiliary unit C outside the triangle BAC. Refer to FIG. 3. The position of the vehicle D is a position at which the coordinates of the vehicle A are used as a start point and a connection line between the vehicle A and the auxiliary unit B rotates at an angle ∠BAD in a direction closer to the auxiliary unit C at a distance of AD.

Specifically, a common rectangular coordinate system is used as an example, and it is assumed that the coordinates of the vehicle A are $(X_a, Y_a)$, then the coordinates $(X_d, Y_d)$ of the vehicle D are:

$$X_d = X_a + AD\cos(\theta - \angle BAD)$$

$$Y_d = Y_a + AD\sin(\theta - \angle BAD)$$

θ is an included angle between the connection line between the vehicle A and the auxiliary unit B relative to the x-axis of the rectangular coordinate system.

Figure 4:
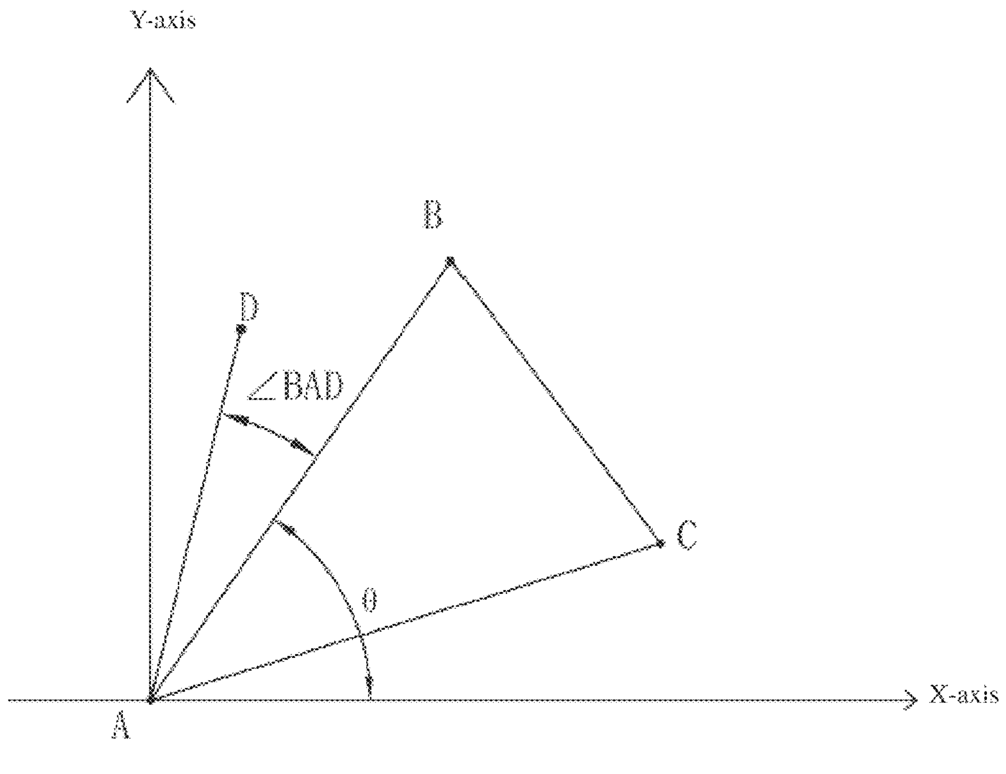
FIG. 4 is a schematic diagram of a vehicle D on the other side outside a triangle BAC according to the present disclosure.

When ∠BAC+∠BAD=∠DAC, it means that the vehicle D is located on an outer side of a connection line between the vehicle A and the auxiliary unit B outside the triangle BAC. Refer to FIG. 4. The position of the vehicle D is a position at which a connection line between the vehicle A and the auxiliary unit B rotates at an angle ∠BAD in a direction away from the auxiliary unit C at a distance of AD.

Specifically, a common rectangular coordinate system is used as an example, and it is assumed that the coordinates of the vehicle A are $(X_a, Y_a)$, then the coordinates $(X_d, Y_d)$ of the vehicle D are:

$$X_d = X_a + AD\cos(\theta + \angle BAD)$$

$$Y_d = Y_a + AD\sin(\theta + \angle BAD)$$

θ is an included angle between the connection line between the vehicle A and the auxiliary unit B relative to the x-axis of the rectangular coordinate system.

The present disclosure further proposes a vehicle auxiliary positioning apparatus, which is installed on a vehicle A and includes:

- a positioning module, configured to detect position information of the vehicle A, which may be a Beidou positioning module or a GPS positioning module;
- a V2X communication module, configured to periodically send position information of the vehicle A to the outside, which may be a 5G V2X communication module and has extremely high real-time performance;
- a detection module, configured to detect a straight-line distance from an external vehicle, where the detection module may be a camera module or a radar module; and
- a determining and calculating module, which uses one of the above vehicle auxiliary positioning method to obtain position coordinates of a vehicle D.

The above are only specific implementations of the present disclosure, but the design concept of the present disclosure is not limited thereto. Any non-substantive changes to the present disclosure using this concept shall constitute an infringement on the protection scope of the present disclosure.

INDUSTRIAL APPLICABILITY

For the vehicle auxiliary positioning method and apparatus of the present disclosure, the vehicle A, the auxiliary unit B, and the auxiliary unit C are all equipped with the V2X communication module and the detection module. Positions for high-precision positioning thereof are sent to the outside by using the V2X communication module, that is, the vehicle A, the auxiliary unit B, and the auxiliary unit C can know actual position coordinates of the others. The detection module may be a detection device such as a camera or a radar to detect a straight-line distance from an external vehicle. Positioning data and a test distance are analyzed, determined, and calculated, so that a vehicle not equipped with 5G communication may be accurately positioned. According to the present disclosure, data is transmitted between a vehicle and an auxiliary unit by using the V2X communication module, so that the amount of transmitted data is small, the influence on a load of the V2X communication is small, a calculation method is simple, the requirements for a controller are not high, and large-scale promotion and application are easy to implement. By using the 5G communication and vehicle-mounted apparatus, the present disclosure is easy to implement in industry, and modules such as the positioning module, the V2X communication module, the detection module, and the determining and calculating module are also easy to manufacture in industry.

The invention claimed is:

1. A vehicle auxiliary positioning method, comprising:

periodically sending, by a first vehicle, position information of the first vehicle to outside;

detecting, by the first vehicle, a second vehicle;

determining that the second vehicle is incapable of sending position information of the second vehicle to the outside; and requesting, by the first vehicle, a first auxiliary unit and a second auxiliary unit to assist in auxiliary and cooperative positioning within a communication range of the first vehicle, wherein the first auxiliary unit and the second auxiliary unit are vehicles or roadside units, wherein the auxiliary and cooperative positioning comprises:

determining whether the second vehicle is located on a straight line on which the first vehicle and the first auxiliary unit or the second auxiliary unit are located or an extension of the straight line;

when the second vehicle is located on the straight line or an extended line on which the first vehicle and the first auxiliary unit or the second auxiliary unit are located, determining coordinates of the second vehicle based on coordinates of the first vehicle, a distance between the first vehicle and the second vehicle, and a direction of a connection line between the first vehicle and the first auxiliary unit or the second auxiliary unit; and when the second vehicle is not located on the straight line or the extended line on which the first vehicle and the first auxiliary unit or the second auxiliary unit are located, determining whether there are triangular relationships among the first vehicle, the second vehicle, and the first auxiliary unit and among the first vehicle, the second vehicle, and the second auxiliary unit separately, and when there are the triangular relationships, calculating coordinates of the second vehicle according to a sine theorem or cosine theorem for a triangle.

2. The vehicle auxiliary positioning method according to claim 1, comprising:

acquiring a first distance AD between the first vehicle and the second vehicle, a second distance AB between the first vehicle and the first auxiliary unit, a third distance AC between the first vehicle and the second auxiliary unit, a fourth distance BD between the first auxiliary unit and the second vehicle, and a fifth distance CD between the second auxiliary unit and the second vehicle, wherein when AD+BD is equal to AB or AB+BD is equal to AD, the second vehicle is located on the straight line or the extended line on which the first vehicle and the first auxiliary unit are located, and when AD+CD is equal to AC or AC+CD is equal to AD, the second vehicle is located on the straight line or the extended line on which the first vehicle and the second auxiliary unit are located.

3. The vehicle auxiliary positioning method according to claim 2, further comprising:

determining whether AD+BD is less than AB or AD+CD is less than AC; and when it is determined that AD+BD is less than AB or AD+CD is less than AC, determining that there is a measurement error and the auxiliary and cooperative positioning cannot be performed.

4. A vehicle auxiliary positioning apparatus using the vehicle auxiliary positioning method according to claim 3, installed on the first vehicle and comprising:

a positioning module, configured to detect the position information of the first vehicle;

a vehicle-to-everything (V2X) communication module, configured to periodically send the position information of the first vehicle to the outside;

a detection module, configured to detect a straight-line distance from an external vehicle; and a determining and calculating module, configured to obtain the coordinates of the second vehicle.

5. The vehicle auxiliary positioning method according to claim 2, wherein the determining whether there are triangular relationships among the first vehicle, the second vehicle, and the first auxiliary unit and among the first vehicle, the second vehicle, and the second auxiliary unit separately comprises:

Determining whether AD+BD is greater than AB and whether AD+CD is greater than AC; and when AD+BD is greater than AB and AD+CD is greater than AC, determining there is a triangular relationship among the first vehicle, the second vehicle, and the first auxiliary unit and determining there is a triangular relationship among the first vehicle, the second vehicle, and the second auxiliary unit.

6. The vehicle auxiliary positioning method according to claim 5, wherein the calculating coordinates of the second vehicle according to a sine theorem or cosine theorem for a triangle comprises:

first, calculating inner angles □BAC, □DAC, and □BAD of the triangle according to the cosine theorem or the sine theorem, wherein A is the first vehicle, D is the second vehicle, B is the first auxiliary unit, and C is the second auxiliary unit;

determining whether the second vehicle is located inside or outside a triangle BAC formed by the first vehicle, the first auxiliary unit, and the second auxiliary unit based on the inner angles; and calculating the coordinates of the second vehicle.

7. The vehicle auxiliary positioning method according to claim 6, wherein when □BAD+□DAC=□BAC, the second vehicle is located on an outer side of a connection line between the first auxiliary unit and the second auxiliary unit inside the triangle BAC or outside the triangle BAC, and the position of the second vehicle is a position at which the coordinates of the first vehicle are used as a start point and a connection line between the first vehicle and the first auxiliary unit rotates at an angle □BAD in a direction closer to the second auxiliary unit at the first distance AD.

8. The vehicle auxiliary positioning method according to claim 6, wherein when □BAC+□DAC=□BAD, the second vehicle is located on an outer side of a connection line between the first vehicle and the second auxiliary unit outside a triangle BAC, and the position of the second vehicle is a position at which the coordinates of the first vehicle are used as a start point and a connection line between the first vehicle and the first auxiliary unit rotates at an angle BAD in a direction closer to the second auxiliary unit at the first distance AD.

9. The vehicle auxiliary positioning method according to claim 6, wherein when □BAC+□BAD=□DAC, the second vehicle is located on an outer side of a connection line between the first vehicle and the first auxiliary unit outside the triangle BAC, and the position of the second vehicle is a position at which a connection line between the first vehicle and the first auxiliary unit rotates at an angle □BAD in a direction away from the second auxiliary unit at the first distance AD.

10. A vehicle auxiliary positioning apparatus using the vehicle auxiliary positioning method according to claim 6, installed on the first vehicle and comprising:

a positioning module, configured to detect the position information of the first vehicle;

a vehicle-to-everything (V2X) communication module, configured to periodically send the position information of the first vehicle to the outside;

a detection module, configured to detect a straight-line distance from an external vehicle; and a determining and calculating module, configured to obtain the coordinates of the second vehicle.

11. A vehicle auxiliary positioning apparatus using the vehicle auxiliary positioning method according to claim 5, installed on the first vehicle and comprising:

a positioning module, configured to detect the position information of the first vehicle;

a vehicle-to-everything (V2X) communication module, configured to periodically send the position information of the first vehicle to the outside;

a detection module, configured to detect a straight-line distance from an external vehicle; and a determining and calculating module, configured to obtain the coordinates of the second vehicle.

12. A vehicle auxiliary positioning apparatus using the vehicle auxiliary positioning method according to claim 2, installed on the first vehicle and comprising:

a positioning module, configured to detect the position information of the first vehicle;

a vehicle-to-everything (V2X) communication module, configured to periodically send the position information of the first vehicle to the outside;

a detection module, configured to detect a straight-line distance from an external vehicle; and a determining and calculating module, configured to obtain the coordinates of the second vehicle.

13. The vehicle auxiliary positioning method according to claim 1, wherein the coordinates of the second vehicle are ($X_d$, $Y_d$),and the determining coordinates ($X_d$, $Y_d$) of the second vehicle based on coordinates of the first vehicle, a distance between the first vehicle and the second vehicle, and a direction of a connection line between the first vehicle and the first auxiliary unit or the second auxiliary unit comprises computing Xa and $Y_d$ as follows:

$$X_d = X_a + AD\cos(\theta)$$

$$Y_d = Y_a + AD\sin(\theta)$$

wherein ($X_a$, $Y_a$) are the coordinates of the first vehicle, AD is the distance between the first vehicle and the second vehicle, θ is an included angle between the straight line on which the first vehicle and the first auxiliary unit or the second auxiliary unit is located relative to an x-axis of a rectangular coordinate system.

14. A vehicle auxiliary positioning apparatus using the vehicle auxiliary positioning method according to claim 13, installed on the first vehicle and comprising:

a positioning module, configured to detect the position information of the first vehicle;

a vehicle-to-everything (V2X) communication module, configured to periodically send the position information of the first vehicle to the outside;

a detection module, configured to detect a straight-line distance from an external vehicle; and a determining and calculating module, configured to obtain the coordinates of the second vehicle.

15. A vehicle auxiliary positioning apparatus using the vehicle auxiliary positioning method according to claim 1, installed on the first vehicle and comprising:

a positioning module, configured to detect the position information of the first vehicle;

a vehicle-to-everything (V2X) communication module, configured to periodically send the position information of the first vehicle to the outside;

a detection module, configured to detect a straight-line distance from an external vehicle; and a determining and calculating module, configured to obtain the coordinates of the second vehicle.

* * * * *